(12) United States Patent
Jersey et al.

(10) Patent No.: US 9,764,935 B2
(45) Date of Patent: *Sep. 19, 2017

(54) MULTI-TOWER MODULAR DISPENSING SYSTEM

(71) Applicant: PepsiCo, Inc., Purchase, NY (US)

(72) Inventors: Steven T. Jersey, Laguna Niguel, CA (US); William W. Segiet, Bethel, CT (US); Tom Siegel, Purchase, NY (US); Eddie Kali, Marietta, GA (US); Joseph Boggs, Newton, CT (US); Robert Balstad, New Millford, CT (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,360

(22) Filed: Nov. 11, 2015

(65) Prior Publication Data

US 2016/0060088 A1  Mar. 3, 2016

Related U.S. Application Data

(60) Continuation of application No. 14/266,338, filed on Apr. 30, 2014, now Pat. No. 9,193,575, which is a
(Continued)

(51) Int. Cl.
*B67D 7/74* (2010.01)
*B67D 1/00* (2006.01)
(Continued)

(52) U.S. Cl.
CPC ......... *B67D 1/0021* (2013.01); *B67D 1/0031* (2013.01); *B67D 1/0043* (2013.01);
(Continued)

(58) Field of Classification Search
CPC ................ B67D 1/0021; B67D 1/0084; B67D 2210/00034; B67D 1/0857; B67D 1/0041;
(Continued)

(56) References Cited

U.S. PATENT DOCUMENTS

| 1,351,133 A | 8/1920 | Scharwath |
| 1,408,397 A | 2/1922 | Ragsdale |

(Continued)

FOREIGN PATENT DOCUMENTS

| CA | 2501127 | 10/2005 |
| CA | 2582130 | 9/2007 |

(Continued)

OTHER PUBLICATIONS

International Search Report and Written Opinion from related PCT Application No. PCT/US2012/036129, mailed Oct. 25, 2012.
(Continued)

*Primary Examiner* — Frederick C Nicolas
(74) *Attorney, Agent, or Firm* — Sterne, Kessler, Goldstein & Fox P.L.L.C.

(57) ABSTRACT

The disclosure concerns a system including a multi-tower modular dispensing system including at least a first dispensing head and a second dispensing head at a counter, a transfer unit located remotely from the counter, piping extending from the transfer unit to the counter, the transfer unit including a centralized ingredient system having a plurality of beverage ingredient sources, the centralized ingredient system configured to supply beverage ingredients to the piping for the dispensing of a first beverage at the counter, the piping including a main micro bundle, the main micro bundle including at least two separate beverage ingredient lines.

20 Claims, 12 Drawing Sheets

Related U.S. Application Data division of application No. 13/116,266, filed on May 26, 2011, now Pat. No. 8,746,506.

(51) Int. Cl.

| | | |
|---|---|---|
| *B67D 1/06* | (2006.01) | |
| *G06Q 30/06* | (2012.01) | |
| *G06Q 50/00* | (2012.01) | |
| *G06Q 50/12* | (2012.01) | |
| *B67D 1/08* | (2006.01) | |
| *B67D 1/07* | (2006.01) | |

(52) U.S. Cl.
CPC ............. *B67D 1/0078* (2013.01); *B67D 1/06* (2013.01); *B67D 1/0857* (2013.01); *B67D 1/0867* (2013.01); *B67D 1/0877* (2013.01); *B67D 1/0888* (2013.01); *B67D 1/0895* (2013.01); *G06Q 30/0635* (2013.01); *G06Q 50/01* (2013.01); *G06Q 50/12* (2013.01); *B67D 1/0016* (2013.01); *B67D 1/0041* (2013.01); *B67D 1/0046* (2013.01); *B67D 1/0081* (2013.01); *B67D 1/0865* (2013.01); *B67D 2001/075* (2013.01); *B67D 2210/00034* (2013.01); *B67D 2210/00049* (2013.01); *B67D 2210/00089* (2013.01)

(58) Field of Classification Search
CPC ...... B67D 1/06; B67D 1/0031; B67D 1/0043; B67D 1/0037; B67D 1/0046; B67D 1/0081; B67D 1/0865; B67D 1/0867; B67D 1/0877; B67D 1/0888; B67D 1/0895; B67D 1/0016; B67D 2210/00089; B67D 1/0078; B67D 2001/075; B67D 2210/00049; B01F 3/04531; B01F 3/0853; G06Q 30/0635; G06Q 50/01; G06Q 50/12

See application file for complete search history.

(56) References Cited

U.S. PATENT DOCUMENTS

| | | | |
|---|---|---|---|
| 2,140,816 A | | 12/1938 | Seitz |
| 2,462,019 A | | 2/1949 | Bowman |
| 2,598,751 A | | 6/1952 | Berkowitz et al. |
| 2,680,455 A | | 6/1954 | Raiteri |
| 2,682,984 A | | 7/1954 | Melikian et al. |
| 2,811,340 A | | 10/1957 | Aghnides |
| 2,880,912 A | | 4/1959 | Fisher |
| 2,887,250 A | | 5/1959 | Zilk |
| 3,011,681 A | | 12/1961 | Kromer |
| 3,224,641 A | | 12/1965 | Morgan |
| 3,305,136 A | * | 2/1967 | Harris .................... B67D 1/12 222/129.1 |
| 3,323,681 A | | 6/1967 | Vette et al. |
| 3,349,968 A | | 10/1967 | Yuza |
| 3,464,591 A | * | 9/1969 | Nicola .................... B67D 1/06 222/135 |
| 3,556,347 A | | 1/1971 | Segal et al. |
| 3,590,855 A | | 7/1971 | Woollen et al. |
| 3,777,937 A | | 12/1973 | Buck |
| 3,814,285 A | | 6/1974 | Craig |
| 3,853,244 A | | 12/1974 | Neumann |
| 3,991,911 A | | 11/1976 | Shannon et al. |
| 4,004,715 A | | 1/1977 | Williams et al. |
| 4,011,967 A | | 3/1977 | Halsey et al. |
| 4,162,028 A | | 7/1979 | Reichenberger |
| 4,202,387 A | | 5/1980 | Upton |
| RE30,301 E | | 6/1980 | Zygiel |
| 4,211,342 A | | 7/1980 | Jamgochian et al. |
| 4,218,014 A | | 8/1980 | Tracy |
| 4,265,371 A | | 5/1981 | Desai et al. |
| 4,282,987 A | | 8/1981 | Thomas et al. |
| 4,392,588 A | | 7/1983 | Scalera |
| 4,433,795 A | | 2/1984 | Maiefski et al. |
| 4,437,499 A | | 3/1984 | Devale |
| 4,467,222 A | | 8/1984 | Gross et al. |
| 4,509,690 A | | 4/1985 | Austin et al. |
| 4,517,651 A | | 5/1985 | Kawasaki et al. |
| 4,529,009 A | | 7/1985 | Horner et al. |
| 4,694,228 A | | 9/1987 | Michaelis |
| 4,736,875 A | | 4/1988 | King |
| 4,753,370 A | | 6/1988 | Rudick |
| 4,784,297 A | | 11/1988 | Katz |
| 4,808,346 A | | 2/1989 | Strenger |
| 4,830,862 A | | 5/1989 | Braun et al. |
| 4,835,701 A | | 5/1989 | Ohiwa et al. |
| 4,863,068 A | | 9/1989 | Smith |
| 4,881,663 A | | 11/1989 | Seymour |
| 4,923,092 A | | 5/1990 | Kirschner et al. |
| 4,940,164 A | | 7/1990 | Hancock et al. |
| 4,946,701 A | | 8/1990 | Tsai et al. |
| 4,962,866 A | | 10/1990 | Phillips |
| 4,979,639 A | | 12/1990 | Hoover |
| 4,987,083 A | | 1/1991 | Apple et al. |
| 4,992,282 A | | 2/1991 | Mehansho et al. |
| 5,009,082 A | | 4/1991 | Abraham, III |
| 5,011,700 A | | 4/1991 | Gustafson et al. |
| 5,021,219 A | | 6/1991 | Rudick et al. |
| 5,027,284 A | | 6/1991 | Senghaas et al. |
| 5,033,651 A | | 7/1991 | Whigham et al. |
| 5,082,143 A | | 1/1992 | Schramm, Jr. |
| 5,108,774 A | | 4/1992 | Mills et al. |
| 5,129,548 A | | 7/1992 | Wisniewski |
| 5,203,474 A | | 4/1993 | Haynes |
| 5,219,224 A | | 6/1993 | Pratt |
| 5,228,312 A | | 7/1993 | Williams |
| 5,269,442 A | | 12/1993 | Vogel |
| 5,314,091 A | | 5/1994 | Credle |
| 5,349,989 A | | 9/1994 | Legallais |
| 5,353,958 A | | 10/1994 | Hawkins |
| 5,368,205 A | | 11/1994 | Groh |
| 5,388,725 A | | 2/1995 | Lichfield |
| 5,454,406 A | | 10/1995 | Rejret et al. |
| 5,473,909 A | | 12/1995 | Kateman et al. |
| 5,474,791 A | | 12/1995 | Zablocki et al. |
| 5,549,219 A | | 8/1996 | Lancaster |
| 5,592,867 A | | 1/1997 | Walsh et al. |
| 5,642,761 A | | 7/1997 | Holbrook |
| 5,660,506 A | | 8/1997 | Berge et al. |
| 5,660,867 A | | 8/1997 | Reynolds et al. |
| 5,678,617 A | | 10/1997 | Kuykendal et al. |
| 5,706,661 A | | 1/1998 | Frank |
| 5,725,125 A | | 3/1998 | Bessette et al. |
| 5,731,981 A | | 3/1998 | Simard |
| 5,788,449 A | | 8/1998 | Riemersma |
| 5,803,320 A | | 9/1998 | Cutting et al. |
| 5,853,244 A | | 12/1998 | Hoff et al. |
| 5,870,944 A | | 2/1999 | Vander Zalm et al. |
| 5,890,626 A | | 4/1999 | Wolski et al. |
| 5,913,454 A | | 6/1999 | McHale |
| 5,930,146 A | | 7/1999 | Takenaka |
| 5,950,870 A | | 9/1999 | Takenaka |
| 5,976,602 A | | 11/1999 | Baron et al. |
| 5,980,969 A | | 11/1999 | Mordini et al. |
| 5,996,842 A | | 12/1999 | Riley et al. |
| 5,997,924 A | | 12/1999 | Olander et al. |
| 6,004,610 A | | 12/1999 | Wang et al. |
| 6,039,987 A | | 3/2000 | Strahl |
| 6,047,859 A | | 4/2000 | Schroeder et al. |
| 6,060,092 A | | 5/2000 | Oesterwind et al. |
| 6,098,842 A | | 8/2000 | Schroeder et al. |
| 6,139,895 A | | 10/2000 | Zablocki et al. |
| 6,170,707 B1 | | 1/2001 | Wolski et al. |
| 6,173,862 B1 | | 1/2001 | Buca et al. |
| 6,186,193 B1 | | 2/2001 | Phallen et al. |
| 6,202,894 B1 | | 3/2001 | Struminski et al. |
| 6,234,354 B1 | | 5/2001 | Phillips et al. |
| 6,237,810 B1 | | 5/2001 | Credle, Jr. |
| 6,253,963 B1 | | 7/2001 | Tachibana |
| 6,265,012 B1 | | 7/2001 | Shamil |

(56) References Cited

U.S. PATENT DOCUMENTS

| | | |
|---|---|---|
| 6,321,938 B1 | 11/2001 | Edwards et al. |
| 6,345,729 B1 | 2/2002 | Santy, Jr. |
| 6,374,845 B1 | 4/2002 | Melendez et al. |
| 6,382,470 B1 | 5/2002 | Hu et al. |
| 6,401,598 B1 | 6/2002 | Tavlarides |
| 6,419,120 B1 | 7/2002 | Bertone |
| 6,449,532 B1 | 9/2002 | Nicol |
| 6,478,192 B2 | 11/2002 | Heyes |
| 6,505,758 B2 | 1/2003 | Black |
| 6,547,100 B2 | 4/2003 | Phillips et al. |
| 6,599,546 B2 | 7/2003 | Palaniappan |
| 6,634,783 B2 | 10/2003 | Baron |
| 6,637,929 B2 | 10/2003 | Baron |
| 6,640,650 B2 | 11/2003 | Matsuzawa et al. |
| 6,681,031 B2 | 1/2004 | Cohen et al. |
| 6,685,059 B2 | 2/2004 | Jones et al. |
| 6,698,229 B2 | 3/2004 | Renken et al. |
| 6,723,365 B2 | 4/2004 | Balaban |
| 6,723,369 B2 | 4/2004 | Burgess |
| 6,726,947 B1 | 4/2004 | Gutwein et al. |
| 6,742,552 B2 | 6/2004 | Raniwala |
| 6,751,525 B1 * | 6/2004 | Crisp, III ............ B67D 1/0057 222/25 |
| 6,756,069 B2 | 6/2004 | Scoville et al. |
| 6,761,036 B2 | 7/2004 | Teague et al. |
| 6,766,656 B1 | 7/2004 | Crisp, III et al. |
| 6,799,085 B1 * | 9/2004 | Crisp, III ............ B67D 1/0057 222/146.6 |
| 6,814,990 B2 | 11/2004 | Zeng |
| 6,827,529 B1 | 12/2004 | Berge et al. |
| 6,866,877 B2 | 3/2005 | Clark et al. |
| 6,871,761 B2 | 3/2005 | Fox |
| 6,877,635 B2 | 4/2005 | Stratton |
| 6,901,968 B2 | 6/2005 | Thomson |
| 6,907,741 B2 | 6/2005 | Kateman |
| 6,952,928 B2 | 10/2005 | Kateman et al. |
| 6,981,387 B1 | 1/2006 | Morgan |
| 6,983,863 B2 | 1/2006 | Santy, Jr. |
| 6,994,231 B2 | 2/2006 | Jones |
| 7,032,780 B2 | 4/2006 | Crisp, III |
| 7,044,336 B2 | 5/2006 | Bertone |
| 7,070,068 B2 | 7/2006 | Fox |
| 7,077,290 B2 | 7/2006 | Bethuy |
| 7,108,156 B2 | 9/2006 | Fox |
| 7,159,743 B2 | 1/2007 | Brandt et al. |
| 7,195,394 B2 | 3/2007 | Singh |
| 7,201,005 B2 | 4/2007 | Voglewede et al. |
| 7,265,673 B2 | 9/2007 | Teller |
| 7,295,889 B2 | 11/2007 | Lahteenmaki |
| 7,334,706 B2 | 2/2008 | Schroeder et al. |
| 7,337,920 B2 | 3/2008 | Duck et al. |
| 7,356,381 B2 | 4/2008 | Crisp, III |
| 7,383,966 B2 | 6/2008 | Ziesel |
| 7,445,133 B2 | 11/2008 | Ludovissie et al. |
| 7,487,887 B2 | 2/2009 | Ziesel |
| 7,507,430 B2 | 3/2009 | Stearns et al. |
| 7,571,835 B2 | 8/2009 | Hill et al. |
| 7,577,496 B2 * | 8/2009 | Walker ............... G06Q 20/10 235/381 |
| 7,578,415 B2 | 8/2009 | Ziesel et al. |
| 7,631,788 B2 | 12/2009 | Litterst et al. |
| 7,648,050 B1 | 1/2010 | Ehlers |
| 7,661,352 B2 | 2/2010 | Sher et al. |
| 7,665,632 B2 | 2/2010 | Ziesel |
| 7,698,021 B2 | 4/2010 | Hughes et al. |
| 7,726,136 B2 | 6/2010 | Baxter et al. |
| 7,757,896 B2 | 7/2010 | Carpenter et al. |
| 7,762,181 B2 | 7/2010 | Boland et al. |
| 7,779,099 B2 * | 8/2010 | Raghunathan ....... G06Q 10/087 221/6 |
| 7,789,273 B2 | 9/2010 | Kadyk et al. |
| 7,798,367 B2 | 9/2010 | Minard et al. |
| 7,799,363 B2 | 9/2010 | Sherwood et al. |
| D625,952 S | 10/2010 | Nevarez et al. |
| 7,806,294 B2 | 10/2010 | Gatipon et al. |
| 7,837,071 B2 | 11/2010 | Achrainer |
| 7,866,509 B2 | 1/2011 | Ziesel |
| 7,905,373 B2 | 3/2011 | Beavis et al. |
| 7,913,879 B2 | 3/2011 | Carpenter et al. |
| 7,997,448 B1 | 8/2011 | Leyva |
| 8,047,402 B2 | 11/2011 | Ziesel |
| 8,074,835 B2 | 12/2011 | MacMichael et al. |
| 8,083,100 B2 | 12/2011 | Minard et al. |
| 8,091,736 B2 | 1/2012 | Beavis et al. |
| 8,091,737 B2 | 1/2012 | Smeller et al. |
| 8,181,824 B2 | 5/2012 | Ziesel et al. |
| 8,479,955 B2 * | 7/2013 | Vesborg ............... B67D 1/0081 222/105 |
| 8,515,574 B2 * | 8/2013 | Studor ................. A47J 31/44 426/433 |
| 8,744,618 B2 * | 6/2014 | Peters ................ B67D 1/0041 700/236 |
| 8,746,506 B2 | 6/2014 | Jersey et al. |
| 8,985,396 B2 | 3/2015 | Jersey et al. |
| 9,020,635 B2 * | 4/2015 | Hortin ................. F25D 23/126 222/129.1 |
| 9,193,575 B2 | 11/2015 | Jersey et al. |
| 2001/0017815 A1 | 8/2001 | Ackermann et al. |
| 2002/0005413 A1 | 1/2002 | Black et al. |
| 2002/0056721 A1 | 5/2002 | Phillips et al. |
| 2002/0102331 A1 | 8/2002 | Chang et al. |
| 2002/0122866 A1 | 9/2002 | Palaniappan et al. |
| 2003/0080443 A1 | 5/2003 | Bosko |
| 2003/0101735 A1 | 6/2003 | Teague et al. |
| 2003/0173370 A1 | 9/2003 | Park |
| 2003/0230597 A1 | 12/2003 | Naik |
| 2004/0007594 A1 | 1/2004 | Esch et al. |
| 2004/0026451 A1 | 2/2004 | Jones |
| 2004/0040983 A1 | 3/2004 | Ziesel |
| 2004/0123619 A1 | 7/2004 | McCann et al. |
| 2004/0129724 A1 | 7/2004 | Stratton |
| 2004/0182250 A1 | 9/2004 | Halliday et al. |
| 2005/0029295 A1 | 2/2005 | Fox |
| 2005/0072799 A1 | 4/2005 | Stratton |
| 2005/0106305 A1 | 5/2005 | Abraham et al. |
| 2005/0166761 A1 | 8/2005 | Jones et al. |
| 2005/0166766 A1 | 8/2005 | Jones et al. |
| 2005/0178793 A1 | 8/2005 | Cheng et al. |
| 2005/0199127 A1 | 9/2005 | Wimmer et al. |
| 2005/0230421 A1 | 10/2005 | Morrow et al. |
| 2005/0251287 A1 | 11/2005 | Thornton et al. |
| 2005/0284885 A1 | 12/2005 | Kadyk et al. |
| 2006/0081653 A1 | 4/2006 | Boland et al. |
| 2006/0097009 A1 | 5/2006 | Bethuy et al. |
| 2006/0113323 A1 | 6/2006 | Jones |
| 2006/0115570 A1 | 6/2006 | Guerrero et al. |
| 2006/0115572 A1 | 6/2006 | Guerrero et al. |
| 2006/0123994 A1 | 6/2006 | Greiwe et al. |
| 2006/0157504 A1 | 7/2006 | Barker et al. |
| 2006/0172056 A1 | 8/2006 | Tobin et al. |
| 2006/0191964 A1 | 8/2006 | Ziesel |
| 2006/0196886 A1 | 9/2006 | Fox |
| 2006/0237479 A1 | 10/2006 | Fox |
| 2006/0278093 A1 | 12/2006 | Biderman et al. |
| 2006/0286262 A1 | 12/2006 | Stearns et al. |
| 2006/0289563 A1 | 12/2006 | Ziesel |
| 2007/0054026 A1 | 3/2007 | Grenville et al. |
| 2007/0131711 A1 | 6/2007 | Minard et al. |
| 2007/0131715 A1 | 6/2007 | Minard et al. |
| 2007/0205219 A1 | 9/2007 | Ziesel et al. |
| 2007/0205220 A1 | 9/2007 | Rudick et al. |
| 2007/0205221 A1 | 9/2007 | Carpenter et al. |
| 2007/0212468 A1 | 9/2007 | White et al. |
| 2007/0218181 A1 | 9/2007 | Illsley et al. |
| 2007/0267441 A1 | 11/2007 | van Opstal et al. |
| 2008/0020115 A1 | 1/2008 | Guerrero et al. |
| 2008/0023099 A1 | 1/2008 | Schubert et al. |
| 2008/0029541 A1 | 2/2008 | Wallace et al. |
| 2008/0041876 A1 | 2/2008 | Frank et al. |
| 2008/0054837 A1 | 3/2008 | Beavis et al. |
| 2008/0073376 A1 | 3/2008 | Gist |
| 2008/0081088 A1 | 4/2008 | Lederman et al. |
| 2008/0144427 A1 | 6/2008 | Phallen |
| 2008/0175970 A1 | 7/2008 | Kobayashi et al. |

(56) References Cited

U.S. PATENT DOCUMENTS

| | | |
|---|---|---|
| 2008/0206415 A1 | 8/2008 | Sherwood et al. |
| 2008/0206429 A1 | 8/2008 | Guerrero et al. |
| 2008/0226770 A1 | 9/2008 | Lee et al. |
| 2008/0226773 A1 | 9/2008 | Lee |
| 2008/0226797 A1 | 9/2008 | Lee et al. |
| 2008/0226798 A1 | 9/2008 | Talebi et al. |
| 2008/0271809 A1 | 11/2008 | Goldman et al. |
| 2008/0277420 A1 | 11/2008 | Edwards et al. |
| 2008/0300714 A1 | 12/2008 | Hughes et al. |
| 2008/0314452 A1 | 12/2008 | Smith |
| 2008/0314926 A1 | 12/2008 | Kumar et al. |
| 2009/0032609 A1 | 2/2009 | Ziesel |
| 2009/0069931 A1* | 3/2009 | Peters ............... B67D 1/0041 700/236 |
| 2009/0069932 A1 | 3/2009 | Rudick |
| 2009/0069933 A1 | 3/2009 | Rudick et al. |
| 2009/0069934 A1 | 3/2009 | Newman et al. |
| 2009/0069949 A1 | 3/2009 | Carpenter et al. |
| 2009/0117224 A1 | 5/2009 | Robergs |
| 2009/0120958 A1 | 5/2009 | Landers et al. |
| 2009/0125457 A1 | 5/2009 | Farhan et al. |
| 2009/0159612 A1 | 6/2009 | Beavis et al. |
| 2009/0162488 A1 | 6/2009 | Bell et al. |
| 2009/0194560 A1 | 8/2009 | Freeman et al. |
| 2009/0230149 A1 | 9/2009 | Smeller et al. |
| 2009/0235826 A1 | 9/2009 | Hart |
| 2009/0250491 A1 | 10/2009 | Erman et al. |
| 2009/0277516 A1 | 11/2009 | Winkler et al. |
| 2009/0285966 A1 | 11/2009 | Tso et al. |
| 2009/0315740 A1 | 12/2009 | Hildreth et al. |
| 2010/0005903 A1 | 1/2010 | Beavis |
| 2010/0006592 A1 | 1/2010 | Maas et al. |
| 2010/0030355 A1 | 2/2010 | Insolia et al. |
| 2010/0065587 A1 | 3/2010 | Erman et al. |
| 2010/0089948 A1 | 4/2010 | Ziesel et al. |
| 2010/0116842 A1 | 5/2010 | Hecht et al. |
| 2010/0133293 A1 | 6/2010 | Ziesel |
| 2010/0143581 A1 | 6/2010 | Eldershaw et al. |
| 2010/0147875 A1 | 6/2010 | Santos et al. |
| 2010/0163572 A1 | 7/2010 | Downham |
| 2010/0170918 A1 | 7/2010 | Achrainer |
| 2010/0181341 A1 | 7/2010 | Robinson |
| 2010/0200110 A1 | 8/2010 | Segiet |
| 2010/0206902 A1 | 8/2010 | Engels et al. |
| 2010/0217685 A1 | 8/2010 | Melcher et al. |
| 2010/0237099 A1 | 9/2010 | Carpenter et al. |
| 2010/0260914 A1 | 10/2010 | Seta et al. |
| 2010/0276444 A1 | 11/2010 | Belcham |
| 2011/0011490 A1 | 1/2011 | Rodrigues |
| 2011/0011888 A2 | 1/2011 | Beavis et al. |
| 2011/0045161 A1 | 2/2011 | Ziesel |
| 2011/0049180 A1 | 3/2011 | Carpenter et al. |
| 2011/0049190 A1 | 3/2011 | Sevcik et al. |
| 2011/0068121 A1 | 3/2011 | Frei et al. |
| 2011/0069578 A1 | 3/2011 | Sirbu Villa |
| 2011/0073212 A1 | 3/2011 | Erbs et al. |
| 2011/0123688 A1 | 5/2011 | Deo |
| 2011/0132923 A1 | 6/2011 | Miller |
| 2011/0146497 A1 | 6/2011 | Sirbu Villa |
| 2011/0163126 A1 | 7/2011 | Carpenter et al. |
| 2011/0204088 A1 | 8/2011 | Luchinger |

FOREIGN PATENT DOCUMENTS

| | | |
|---|---|---|
| CA | 2662872 | 3/2008 |
| CA | 2667383 | 5/2008 |
| DE | 3434174 | 3/1986 |
| DE | 4237933 | 5/1994 |
| DE | 19526215 | 2/1996 |
| DE | 20 2006 010613 | 8/2007 |
| EP | 958234 | 11/1999 |
| EP | 1626375 | 2/2006 |
| EP | 1627849 | 2/2006 |
| EP | 2314186 | 4/2011 |
| GB | 2091449 | 7/1982 |
| GB | 2101088 | 1/1983 |
| GB | 2130399 | 5/1984 |
| GB | 2166833 | 5/1986 |
| GB | 2 194 508 A | 3/1988 |
| GB | 2303354 | 2/1997 |
| GB | 2416757 | 2/2006 |
| GB | 2429694 | 3/2007 |
| GB | 2 465 083 A | 12/2010 |
| JP | 200023882 | 9/2000 |
| WO | WO 9902449 | 1/1999 |
| WO | WO 2005111955 | 11/2005 |
| WO | WO 2007056407 | 5/2007 |
| WO | WO 2007/146452 A2 | 12/2007 |
| WO | WO 2008028294 | 3/2008 |
| WO | WO 2008049222 | 5/2008 |

OTHER PUBLICATIONS

International Search Report and Written Opinion from related PCT Application No. PCT/US2012/036116, mailed Nov. 14, 2012.
European Patent Office Communication of a Notice of Opposition related to European Patent No. EP2714577, mailed Apr. 12, 2017.
European Patent Office Notice of Opposition to a European Patent related to European Patent No. EP2714577.

* cited by examiner

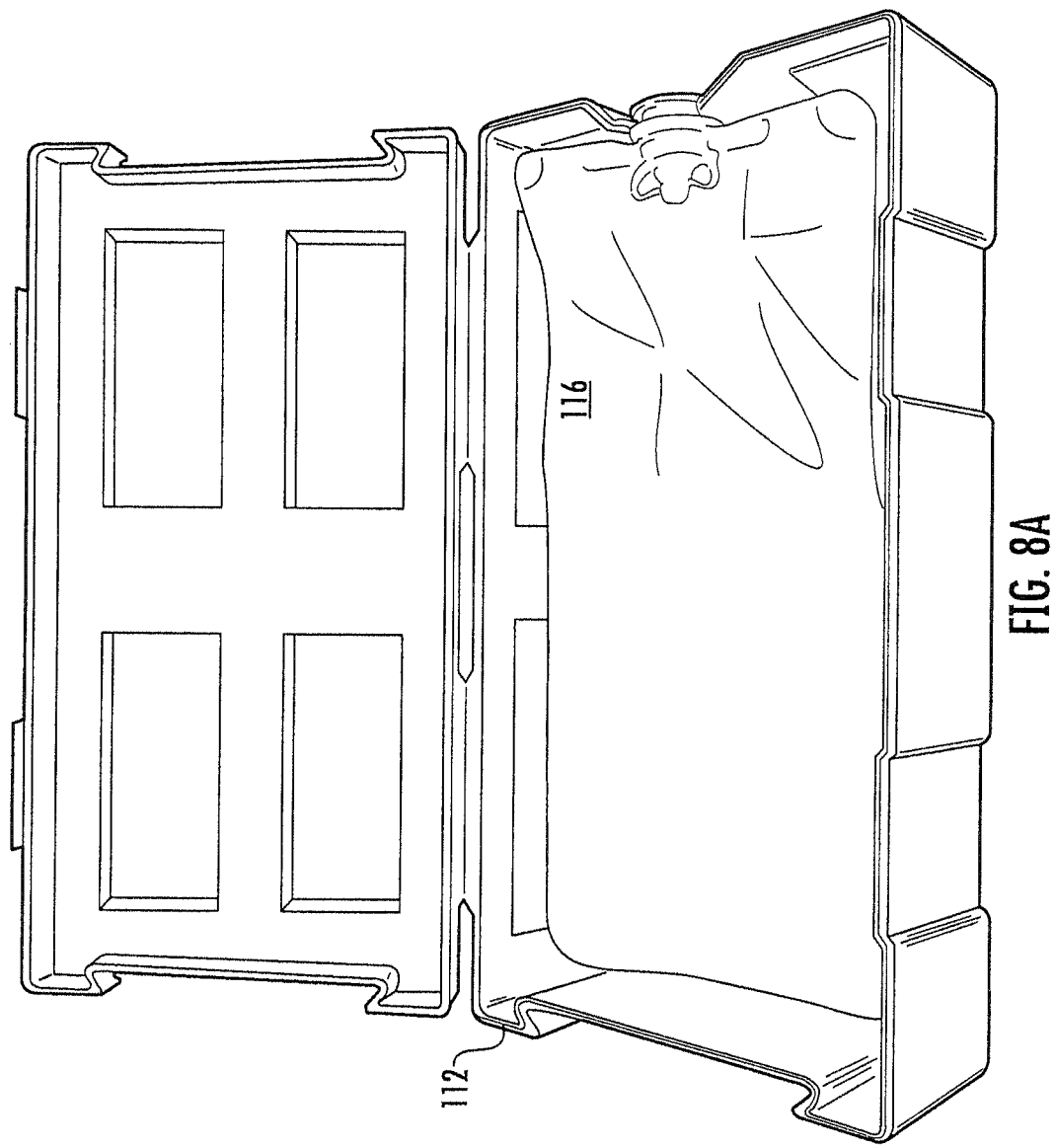

MULTI-TOWER MODULAR DISPENSING SYSTEM

CROSS-REFERENCE TO RELATED APPLICATIONS

This application is a continuation of co-pending U.S. application Ser. No. 14/266,338, filed Apr. 30, 2014, and additionally claims priority to U.S. application Ser. No. 13/116,266, filed May 26, 2011, entitled "Multi-Tower Modular Dispensing System," the entire disclosures of which is hereby incorporated by reference in their entirety and for all purposes.

FIELD OF THE INVENTION

This disclosure relates generally to a method and modular beverage dispensing system for the dispensing of beverages, e.g., for restaurants (including fast food restaurants), theatres, convenience stores, gas stations, and other entertainment and/or food service venues.

BACKGROUND

Various beverage dispensers, such as those at restaurants, theatres and other entertainment and/or food service venues, typically have either a "drop in" dispenser apparatus or a counter top type dispenser apparatus. In a drop in dispenser apparatus, the dispenser apparatus is self-contained and may be dropped into an aperture of a counter top. In a counter top type dispenser apparatus, the dispenser apparatus is placed on a counter top. In conventional beverage dispensers, a dispensing head is coupled to a particular drink syrup supply source via a single pipe dedicated to supply the particular drink syrup to that dispensing head, wherein the particular drink syrup supply source is typically located near the counter top, i.e., directly under the counter top, or directly over the counter top.

A user will typically place a cup under the signage of the selected beverage and either press a button or press the cup against a dispensing lever to activate the dispenser so that the selected beverage is delivered from the dispensing head corresponding to the selected beverage and into the cup until pressure is withdrawn from the button or lever.

Conventional beverage dispensers are typically limited to dispensing drinks having flavoring supply sources located at their respective counters. Thus, a limited number of drinks are typically available at a conventional beverage dispenser. For example, drinks typically available at a conventional beverage dispenser are a regular cola beverage, a diet cola beverage, perhaps one or several non-cola carbonated beverages, such as a lemon-lime flavored carbonated beverage or some other fruit-flavored drink (e.g., orange flavored carbonated beverage, and/or root beer), and perhaps one more non-carbonated beverage(s), such as a tea and/or a lemonade.

Conventional dispensers are not typically configured to permit a user generate or receive from a single dispensing head a custom-ordered beverage that a consumer may wish to purchase, e.g., a cola flavored with cherry, vanilla, lemon, or lime, etc., or a tea flavored with lemon, orange, peach, raspberry, etc., or a tea having one or more teaspoons of sweetener (sugar, or some other nutritive sweetener or non-nutritive sweetener).

Conventional dispensers typically require servicing and resupply of flavoring sources at the counter.

Conventional dispensers typically require a dedicated dispensing head for each particular beverage.

What is needed is a beverage dispensing system that does not have the limitations and disadvantages of conventional beverage dispensers and methods.

SUMMARY

Accordingly, there is provided a multi-tower modular dispensing system.

In one aspect, a multi-tower dispensing system may comprise at least a first dispensing head and a second dispensing head at a counter, a transfer unit located remotely from the counter, and piping extending from the transfer unit to the counter. The transfer unit may comprise a centralized ingredient system having a plurality of beverage ingredient sources. The centralized ingredient system may be configured to supply beverage ingredients to the piping for the dispensing of a first beverage at the counter. The piping may comprise a main micro bundle, the main micro bundle comprising at least two separate beverage ingredient lines.

In one aspect, a multi-tower modular dispensing system may comprise at least a first dispensing head at a first counter, at least a second dispensing head at a second counter, the first and second counters remote from each other, a transfer unit located remotely from the first counter and the second counter, and piping extending from the transfer unit to the first counter and the second counter. The transfer unit may comprise a centralized ingredient system having a plurality of beverage ingredient sources. The centralized ingredient system may be configured to supply beverage ingredients to the piping for the dispensing of a first beverage at the first counter and for the dispensing of a second beverage at the second counter. The piping may comprise a main micro bundle, the main micro bundle comprising at least two separate beverage ingredient lines.

In one aspect, a multi-tower modular dispensing system may comprise a plurality of dispensing heads at a first counter, a plurality of dispensing heads at a second counter, the first and second counters remote from each other, a transfer unit located remotely from the first counter and the second counter, and piping extending from the transfer unit to the first counter and the second counter. The transfer unit may comprise a centralized ingredient system having a plurality of beverage ingredient sources, the centralized ingredient system configured to supply beverage ingredients to the piping for the dispensing of a plurality of beverages at the first counter and for the dispensing of a plurality of beverages at the second counter, the piping comprising at least one main micro bundle, the main micro bundle comprising a plurality of separate beverage ingredient lines.

The above and other aspects, features and advantages of the present disclosure will be apparent from the following detailed description of the illustrated embodiments thereof which are to be read in connection with the accompanying drawings.

BRIEF DESCRIPTION OF THE DRAWINGS

FIGS. 8A and 8B illustrate an embodiment of a cartridge for a beverage ingredient according to various aspects of the disclosure.

DETAILED DESCRIPTION OF THE PREFERRED EMBODIMENTS

The embodiments discussed below may be used to form a wide variety of beverages, including but not limited to cold and hot beverages, and including but not limited to beverages known under any PepsiCo branded name, such as Pepsi-Cola®.

Figure 1:
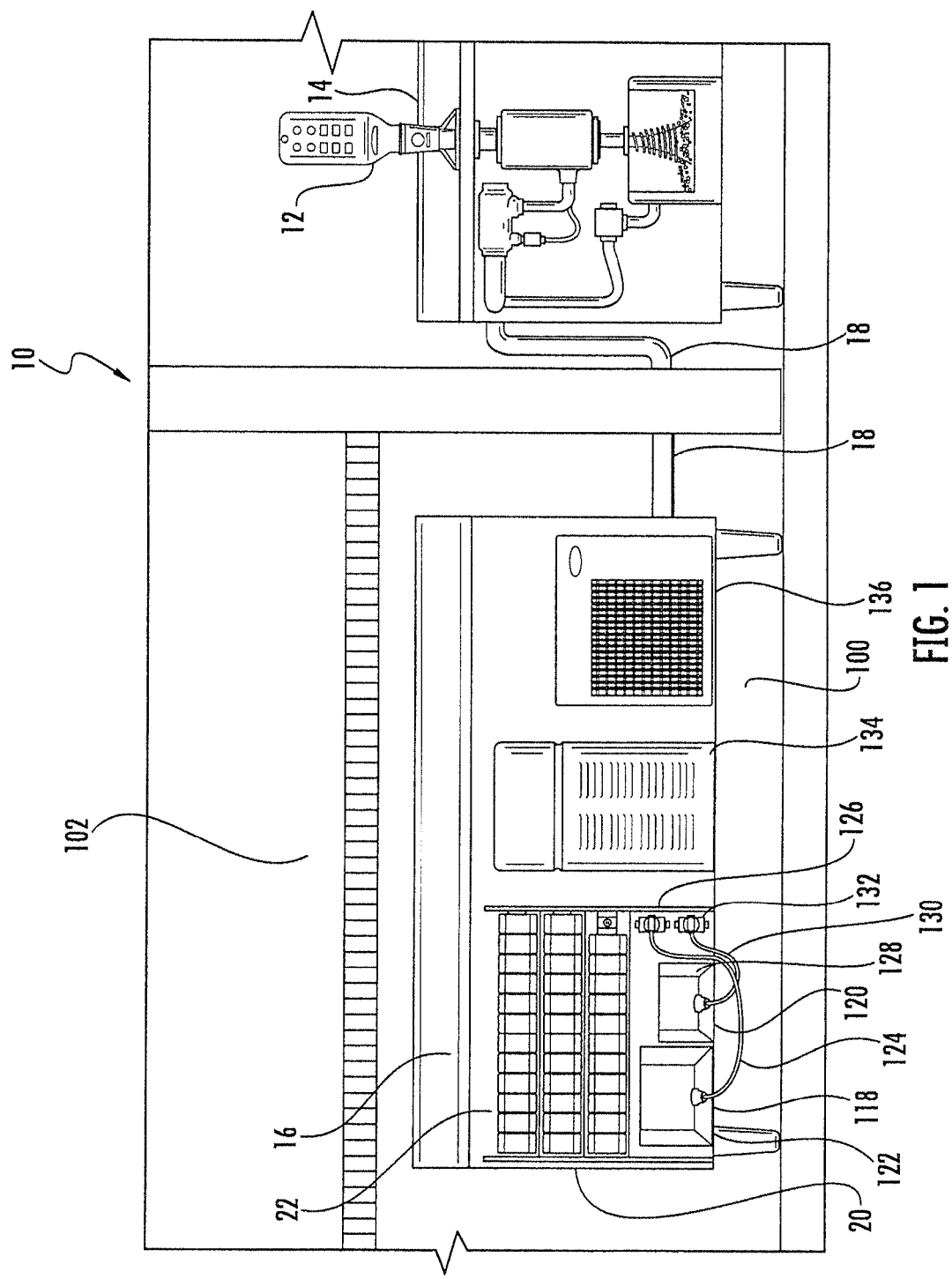
FIG. 1 is schematic view of an embodiment of a modular dispensing system according to various aspects of the disclosure.

Referring to FIG. 1, the description of one embodiment of the modular dispensing system of the present disclosure will be described.

Referring to FIG. 1, a modular dispensing system 10 may be provided comprising a plurality of dispensing heads 12 at a counter location 14, and a transfer unit 16 located remotely from the counter location 14. Piping 18 may extend from the transfer unit 16 to the counter location 14.

Figure 2:
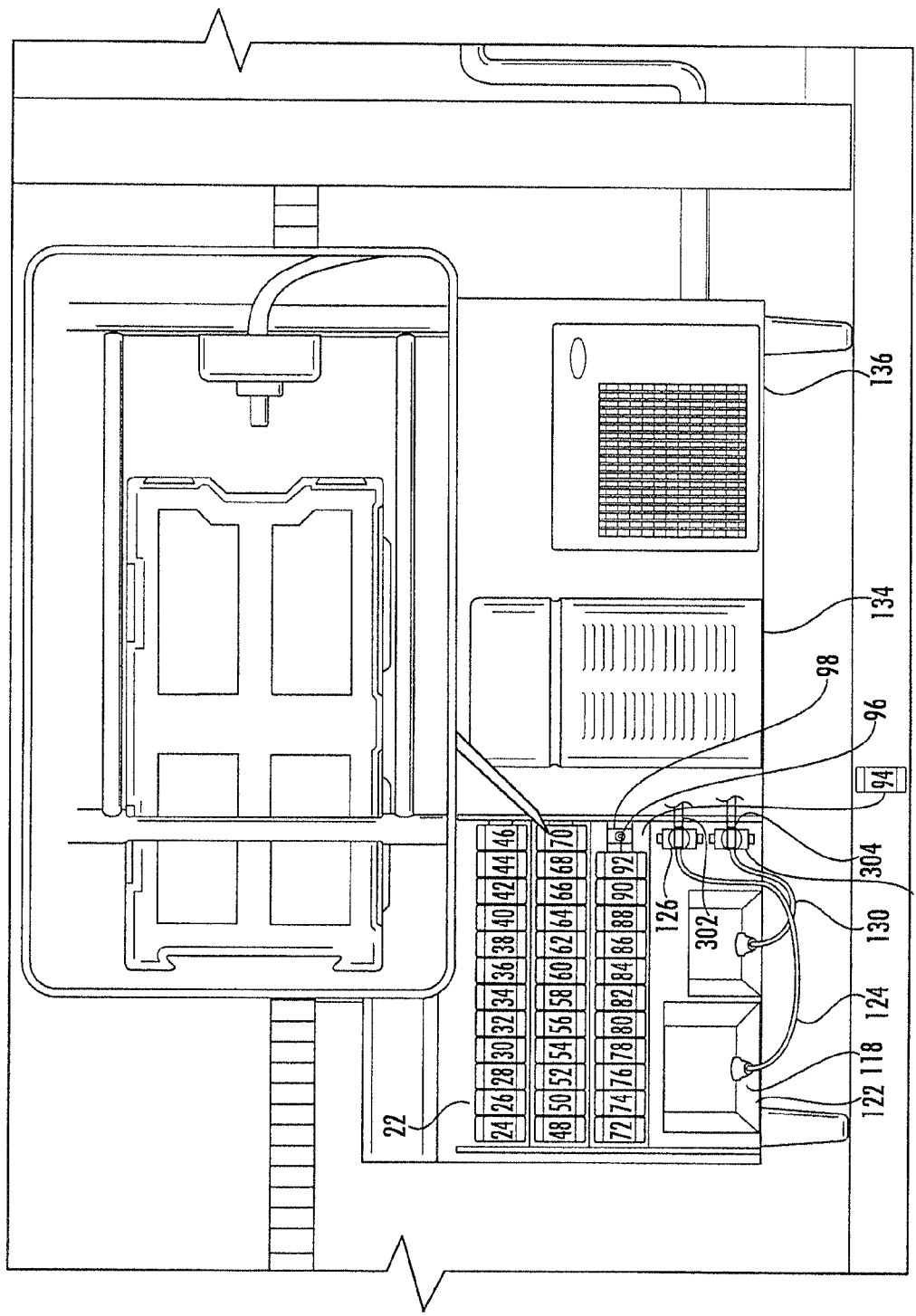
FIG. 2 illustrates an embodiment of a central linked ingredient system according to various aspects of the disclosure.
Figure 9:
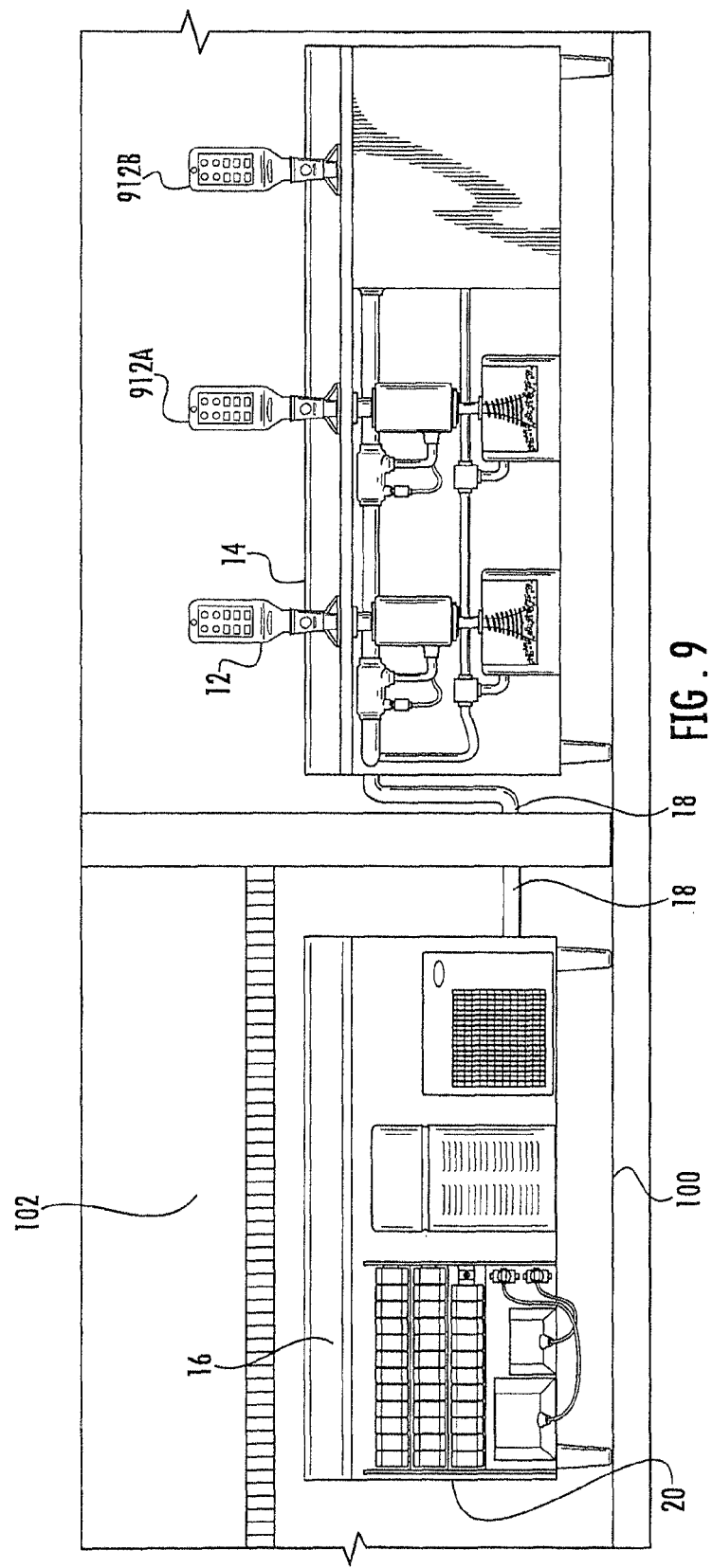
FIG. 9 illustrates the embodiment of FIG. 1, with the addition of additional dispensing heads at a single counter according to various aspects of the disclosure.
Figure 10:
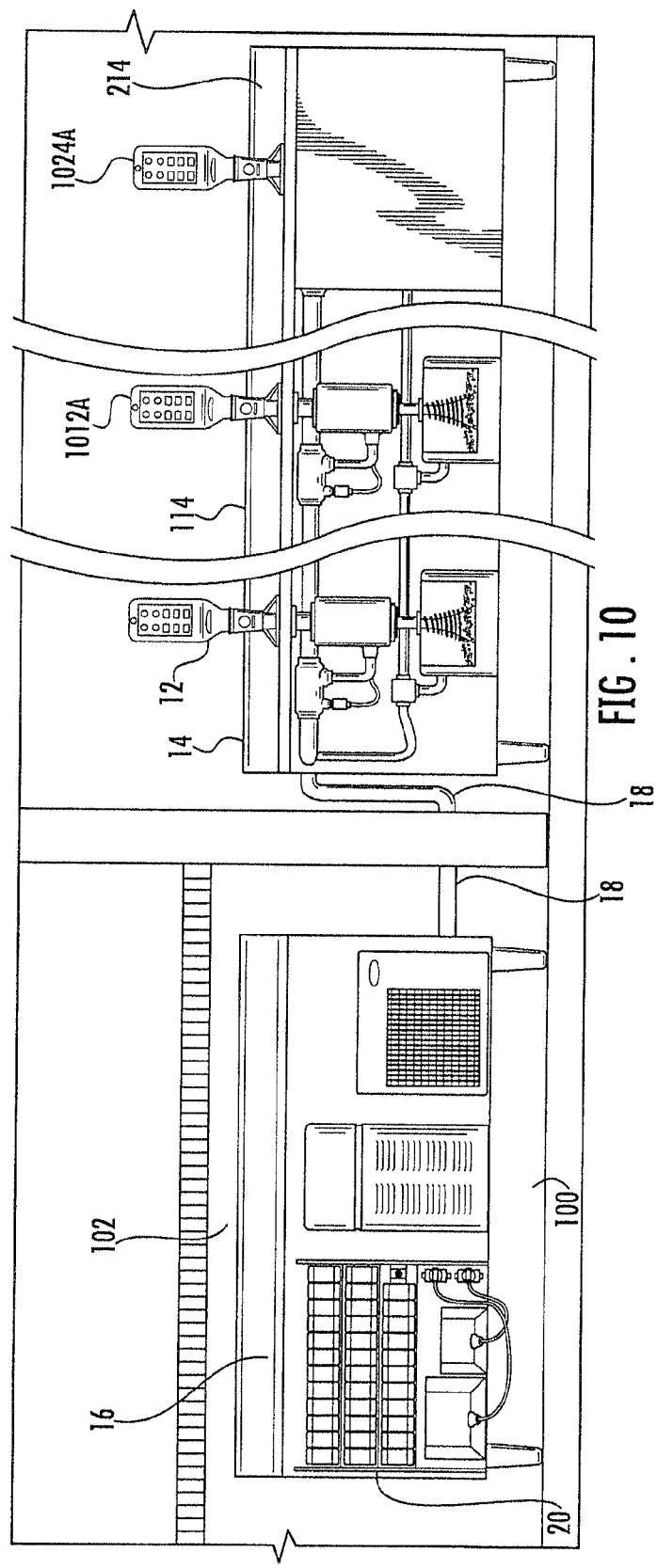
FIG. 10 illustrates the embodiment of FIG. 1, with the addition of an additional counter having an additional dispensing head according to various aspects of the disclosure.
Figure 11:
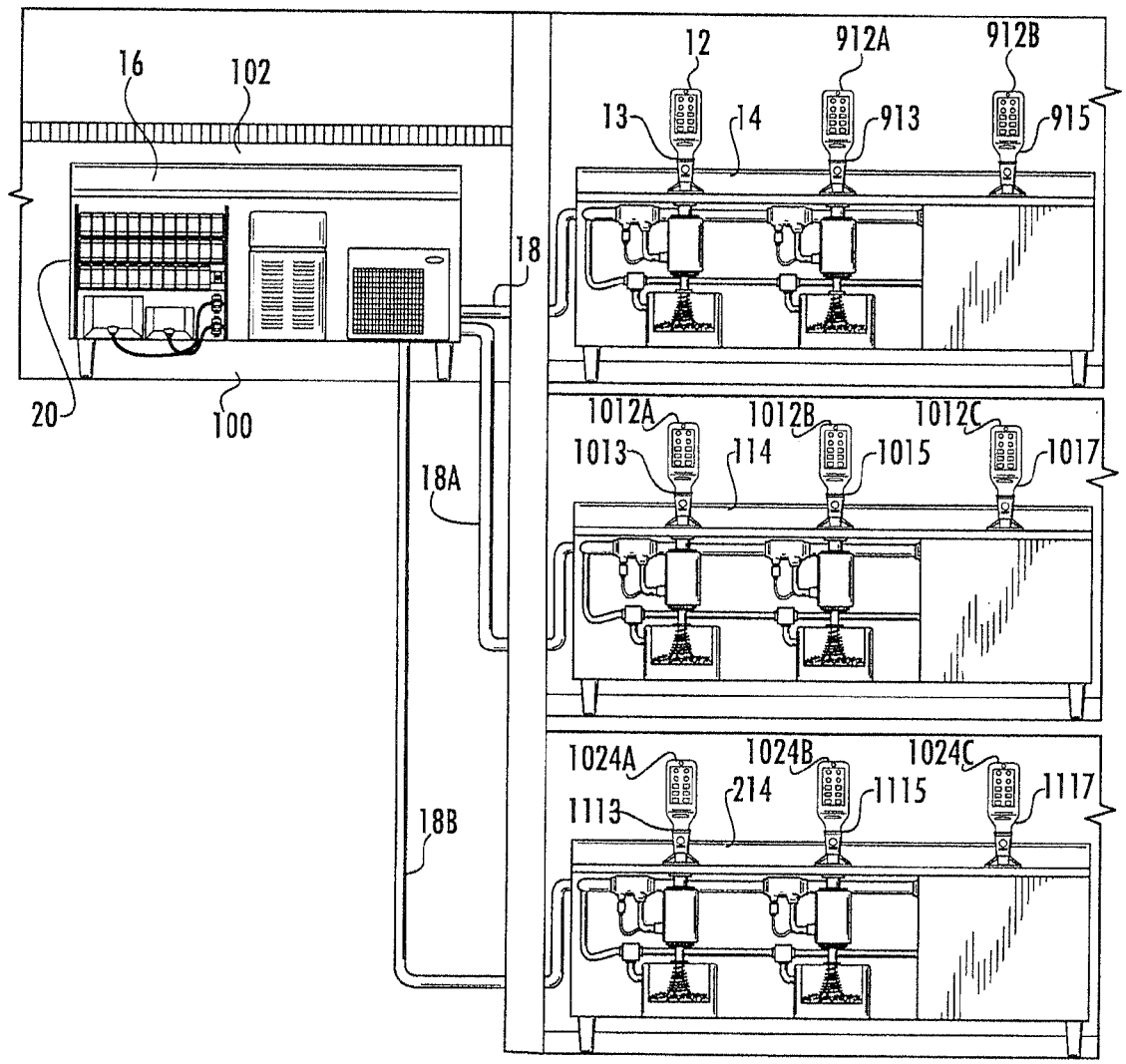
FIG. 11 illustrates the embodiment of FIG. 10, with the addition of additional dispensing heads at each counter according to various aspects of the disclosure.

Referring to FIG. 1 and FIG. 2, the transfer unit 16 may comprise a centralized ingredient system 20 having a plurality of sources 22 of beverage ingredients 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, and 94. FIGS. 1 and 2 show that beverage ingredient 94 may be placed next to beverage ingredient 92, and beverage ingredient 94 may flow into an opening 96 of pipe 98. As described in greater detail below, pipe 98 may be one of the pipes that comprise piping 18. The centralized ingredient system 20 may supply beverage ingredients 24 through 94 to a dispensing head 12 for more than one beverage. FIG. 9 illustrates the embodiment of FIG. 1, with the addition of additional dispensing heads 912A and 912B at a single counter 14. FIG. 10 illustrates the embodiment of FIG. 1, with the addition of an additional counter 114 having an additional dispensing head 1012A, and an additional counter 214 having an additional dispensing head 1024A. At least one of the dispensing heads may be a dispensing head for a drive-through pick up window. While the counters in FIG. 10 depicts the counters in series, those of skill in the art will recognize that the counters may also be configured in parallel, e.g., with a separate micro bundle leaving transfer unit 16 for each counter. FIG. 11 illustrates a variation of embodiments shown in FIG. 9 and FIG. 10, showing dispensing heads 12, 912A, and 912B at counter 14 (which may be supplied with beverage ingredients via main micro bundle 18), dispensing heads 1012A, 1012B and 1012C at counter 114 (which may be supplied with beverage ingredients via main micro bundle 18A), and dispensing heads 1024A, 1024B and 1024 at counter 214 (which may be supplied with beverage ingredients via main micro bundle 18B). While the counters in FIG. 11 depicts the counters in parallel, those of skill in the art will recognize that the counters may also be configured in series, e.g., with a single main micro bundle 18 leaving transfer unit 16 and supplying beverage ingredients to each counter 14, 114, and 124 in series. At least one counter may have a dispensing head dedicated supplying beverages for a drive through window. Those of skill in the art will recognize that the system may have the same or different beverage ingredients supplied to different dispensing heads located at different dispensing towers 13, 913, 915, 1013, 1015, 1017, 1113, 1115, and 1117.

Centralized ingredient system 20 may supply beverage ingredients 24 through 94 for a greater number of beverages than the number of dispensing heads 12 that are located at one counter location 14. As shown in FIG. 10, the centralized ingredient system 20 may supply beverages to dispensing heads located at counter locations 14, 114, 214 that are remote from one another, including but not limited to a counter location 214 for a drive-through window. The centralized ingredient system 20 may be placed at a remote location 100 from counter locations 14, 114, 214, e.g., a back room 102, which preferably is not viewable from at least one counter location. In a preferred embodiment, the centralized ingredient system is not viewable by patrons or customers using a dispenser and/or purchasing a beverage at a counter location.

Figure 3:
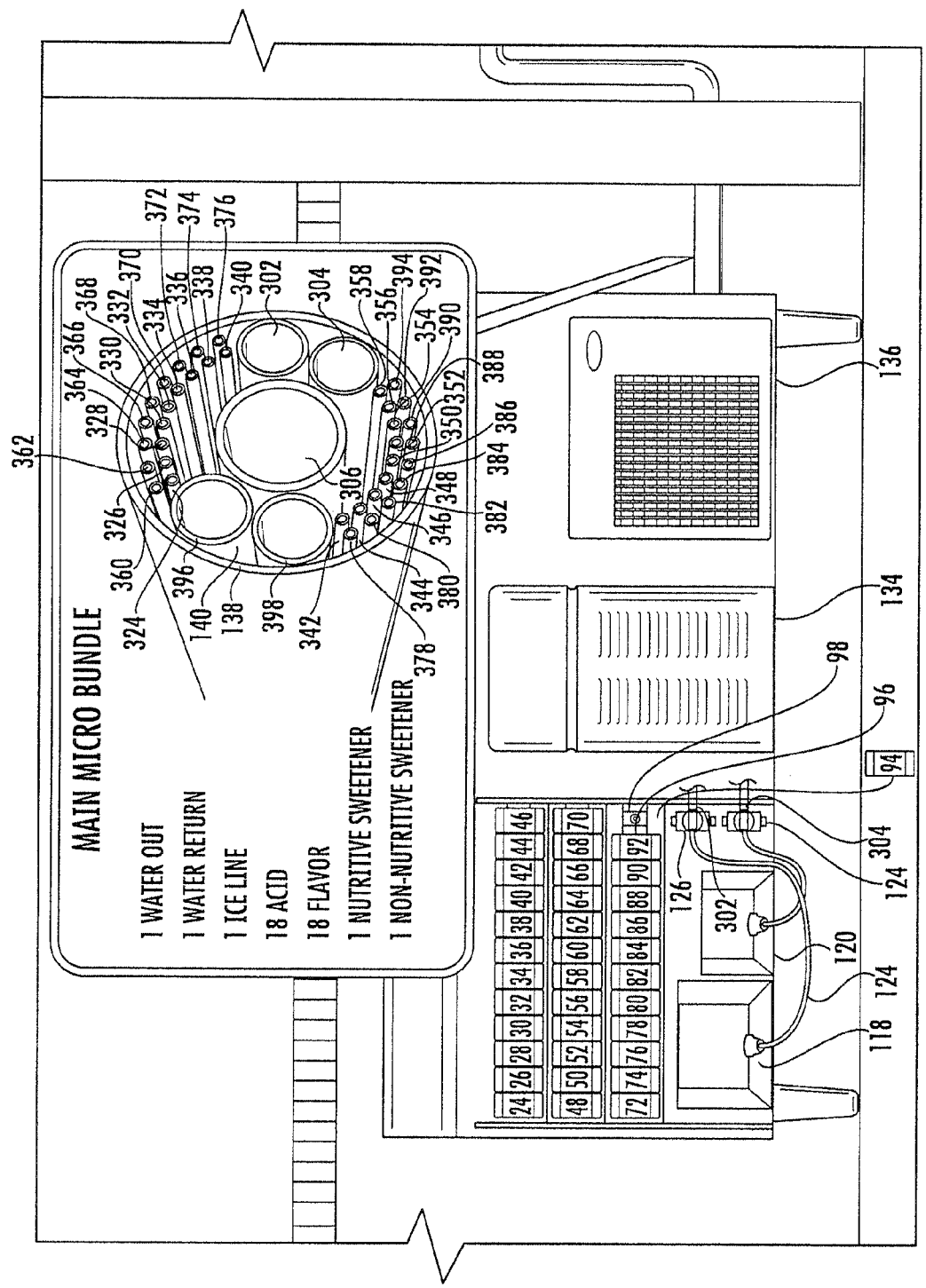
FIG. 3 illustrates is a perspective of an embodiment of a main micro bundle according to various aspects of the disclosure.
Figure 8B:
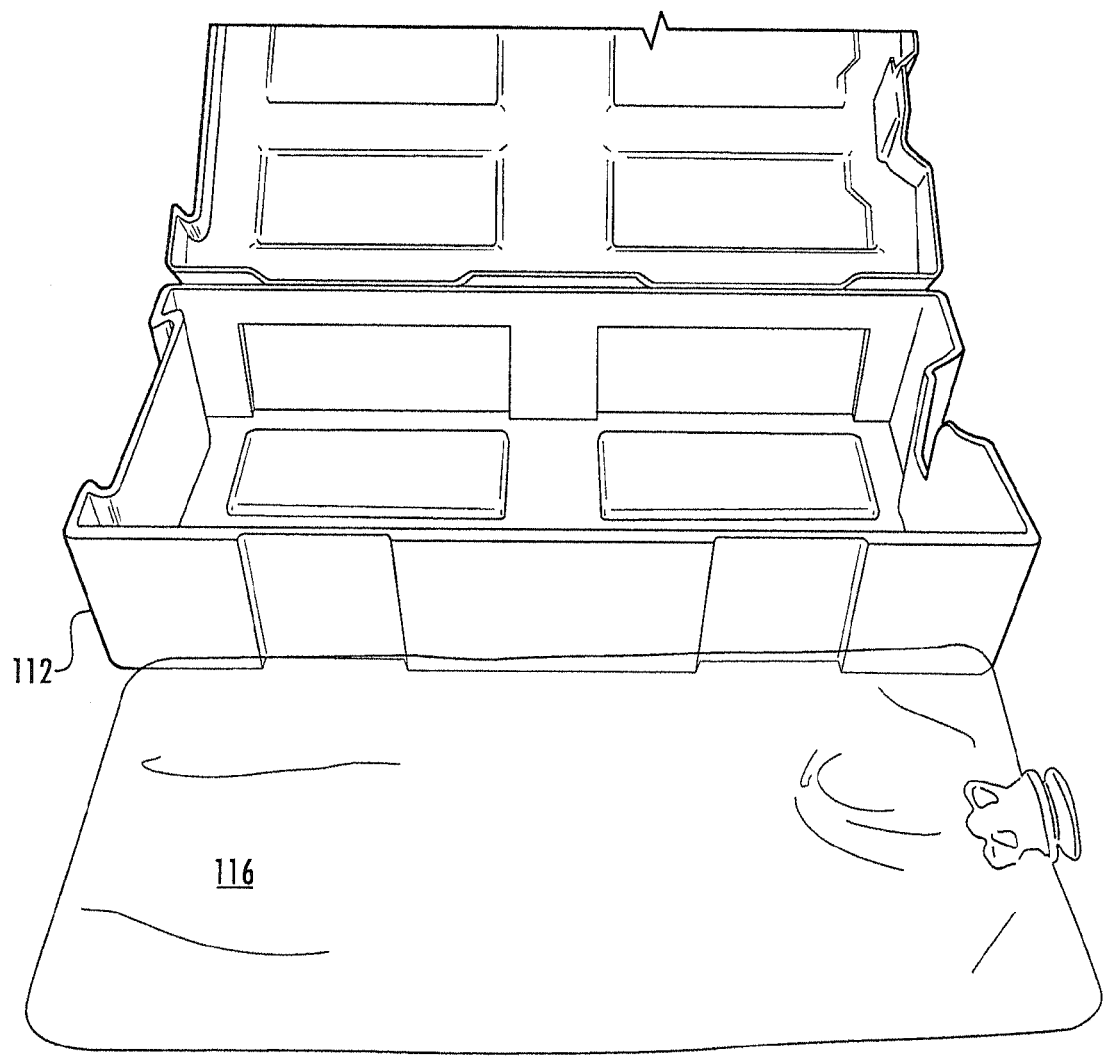

The centralized ingredient system 20 may comprise a plurality of highly concentrated ingredients for micro dosing in the preparation of a wide variety of beverages. For example, but not by way of limitation, FIGS. 1, 2, and 3 illustrate thirty-six beverage ingredients 24 through 94. Each beverage ingredient 24 through 94 may be stored in a cartridge or storage container 112. As shown in FIGS. 8A and 8B, cartridge 112 may comprise a bag 116 filled with a beverage ingredient. Each cartridge 112 may store an ingredient that is different from the ingredient stored in every other cartridge 112 that comprise a grouping of plurality of sources 22.

The centralized ingredient system 20 may comprise a plurality of sweeteners 118 and 120. Sweetener 118 may be a nutritive sweetener, and sweetener 120 may be a non-nutritive sweetener.

Transfer unit 16 comprises nutritive sweetener cartridge or container 122, which contains nutritive sweetener 118, and corresponding nutritive sweetener in pump line 124, nutritive sweetener pump 126, and nutritive sweetener out pump line 302.

Transfer unit 16 may comprise non-nutritive sweetener cartridge or container 128, which may contain non-nutritive sweetener 120, and corresponding non-nutritive sweetener in pump line 130, non-nutritive pump 132, and non-nutritive sweetener out pump line 304.

Pump 126 may pump nutritive sweetener 118, and pump 132 may pump non-nutritive sweetener 120 from the transfer unit 16 through piping 18 to dispensing head 12.

Other pumps (not shown) may be used to pump beverage ingredients 24 through 94 from the transfer unit 16 through piping 18 to dispensing head 12.

Another pump or pumps (not shown) may be used to pump water from transfer unit 16 through piping 18 to dispensing head 12. The transfer unit 16 may comprise a water treatment system 134. Water treatment system 134 may be used to treat water. For example, water treatment system 134 may be used to cool water to a desired temperature for a cold beverage. A second water treatment (not shown) may be used to heat water to desired temperature for hot beverages. Water temperature ranges provided by water treatment system(s) used in connection with water treatment systems may be just below about freezing (e.g., to create or prepare a slurry or slush product) through about 180 degrees Fahrenheit (e.g., to create or prepare a hot beverage, such as a coffee or tea). The water treatment system may be any suitable water treatment system that improves taste, reduces odors, and/or reduces chlorines. The water treatment system may be any suitable water treatment system that may improve water quality to near pure water through systems, including but not limited to reverse osmosis (RO). As discussed in greater detail below, treated water is from water treatment system, and a least one beverage ingredient from the centralized ingredient system may be provided to counter location 14. The ratio of water from water treatment system 134 to beverage ingredients provided from centralized ingredient system 20 for a beverage may be about 200 to 1 by weight. In one embodiment, the minimum ingredient may be about 200:1, or about 75:1, or about 40:1 (e.g., in the form of a flavor or acid), through about 40:1 for non-nutritive sweeteners, and about 6:1 for non-nutritive sweeteners. A base beverage may be prepared with about four streams, e.g., water, a sweetener, flavor, and acid). Additional streams may be added to provide top notes, e.g., cherry flavor, or sweetener blends to reduce calories, such as disclosed in U.S. Ser. No. 12/703,048, filed Feb. 9, 2010, which is incorporated herein by reference in its entirety.

Another pump or pumps (not shown) may be used to pump ice from transfer unit 16 through piping 18 to dispensing head 12. In one preferred embodiment, the transfer unit 16 may comprise an ice machine 136.

As shown in FIG. 3, piping or main micro bundle 18 may comprise an outer pipe 138, and bundle of smaller inner pipes 140. Inner pipes 140 may comprise beverage ingredient flavor lines 324, 326, 328, 330, 332, 334, 336, 338, 340, 342, 344, 346, 348, 350, 352, 354, 356, and 358, Inner pipes 140 may comprise beverage ingredient acid lines 360, 362, 364, 366, 368, 370, 372, 374, 376, 378, 380, 382, 384, 386, 388, 390, 392, and 394.

Beverage ingredient flavor line 324 corresponds to beverage ingredient 24, beverage ingredient flavor line 326 corresponds to beverage ingredient 26, etc. The following Table I identifies the correspondence between beverage ingredients and lines.

TABLE I

| Beverage ingredient | Line |
| --- | --- |
| 24 | 324 |
| 26 | 326 |
| 28 | 328 |
| 30 | 330 |
| 32 | 332 |
| 34 | 334 |
| 36 | 336 |
| 38 | 338 |
| 40 | 340 |
| 42 | 342 |
| 44 | 344 |
| 46 | 346 |
| 48 | 348 |
| 50 | 350 |

TABLE I-continued

| Beverage ingredient | Line |
| --- | --- |
| 52 | 352 |
| 54 | 354 |
| 56 | 356 |
| 58 | 358 |
| 60 | 360 |
| 62 | 362 |
| 64 | 364 |
| 66 | 366 |
| 68 | 368 |
| 70 | 370 |
| 72 | 372 |
| 74 | 374 |
| 76 | 376 |
| 78 | 378 |
| 80 | 380 |
| 82 | 382 |
| 84 | 384 |
| 86 | 386 |
| 88 | 388 |
| 90 | 390 |
| 92 | 392 |
| 94 | 394 |

FIG. 3 illustrates a water out line 396, water return line 398, ice line 306, nutritive sweetener out pump line 302, and non-nutritive sweetener out pump line 304. Water return line 398 may allow for the circulating of water that is not dispensed from a dispensing head 12 to be returned to transfer unit 16 to makeup cold water to be supplied from transfer unit 16 to doser unit 400. This helps conserve energy since the water in water return line 398 will be closer to the desired temperature than water that has not been previously cooled. A hot water out line and a hot water return line may also be provided. A hot water return line (not show) may be used to allow for the circulating of water that is not dispensed from a dispensing head 12 to be returned to transfer unit 16 to makeup hot water to be supplied from transfer unit to doser unit 64. This helps conserve energy since the water in a hot water return line will be closer to the desired temperature than water that has not been previously heated. The ice line 306 may be the largest of the lines in the bundle. Water out line 396 and water return line 398 may be about equal diameter, e.g., about ⅜" diameter lines. The nutritive sweetener out pump line 302 may have about equal diameter or slightly larger diameter as the non-nutritive sweetener out pump line 304. For example, the nutritive sweetener line may have a diameter of about ⅜" inches, and the non-nutritive sweetener may have a diameter of about ¼" inches. The sweetener lines may comprise any desired number, e.g., four different sweetener lines.

Figure 4:
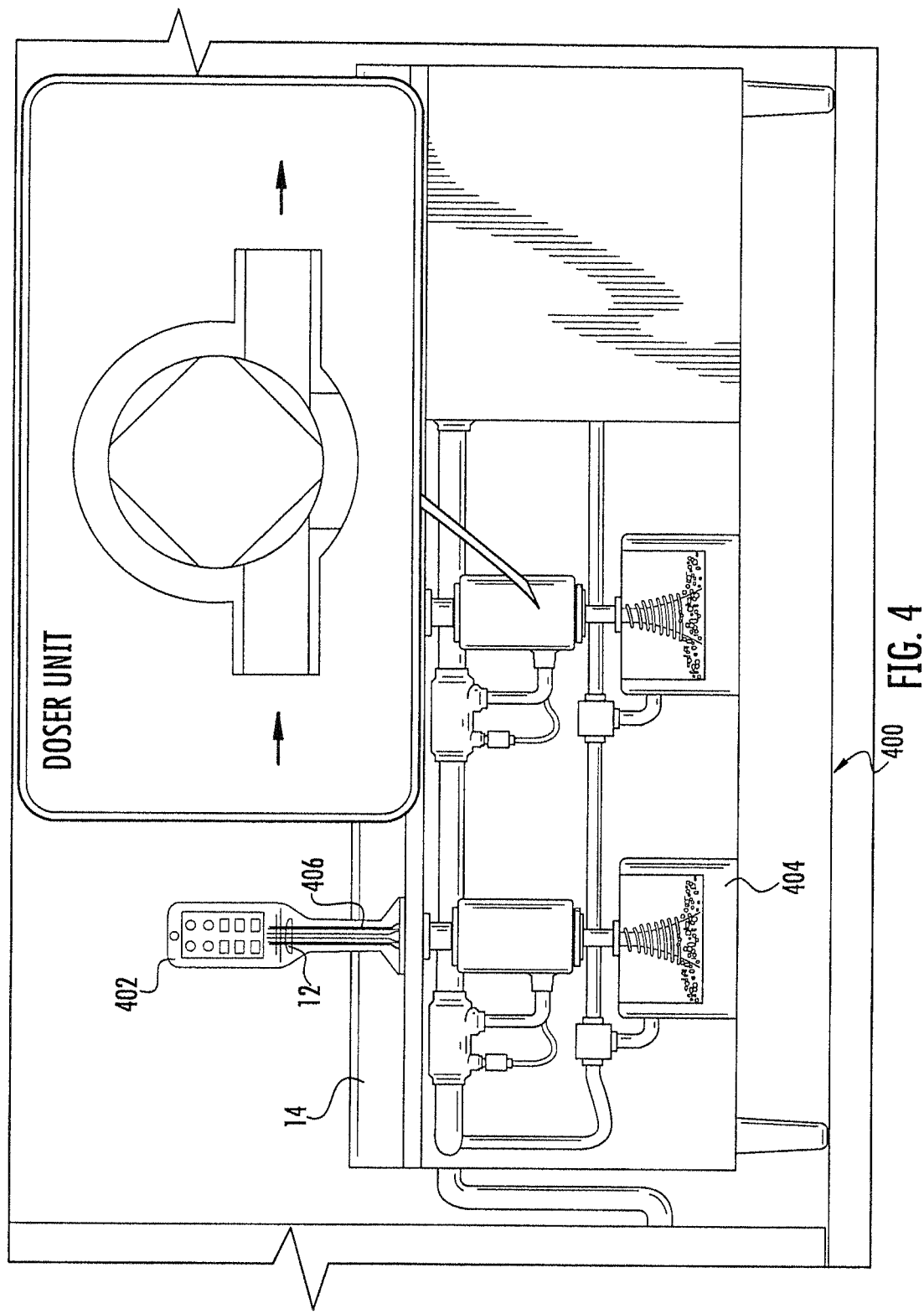
FIG. 4 illustrates an embodiment of a doser unit according to various aspects of the disclosure.

As shown in FIG. 4, doser unit 400 may comprise dispenser tower 402, which may comprise dispenser head 12 at counter location 14. Doser unit 400 may comprise an ice hopper 404. Doser unit 404 may receive liquid under pressure and dose appropriately to provide a desired beverage. The dosing of a beverage ingredient may be between about 0.1 cc to about 17 cc. In one embodiment, dosing may be about 0.5 cc to 17 cc for a nutritive sweetener. Dosing may be performed by a sliding vane pump as shown in FIG. 4, or other suitable positive displacement pump, gear pump, piston pump, oscillating pump, or diaphragm pump (not shown). The pump may be controlled through pulse width modulation, stroked or stepped to deliver the appropriate volume of an ingredient to form a beverage. Those of skill in the art will recognize that control of delivery may be achieved through use of an intelligent device, such a computer or purpose embedded electronics.

Figure 5:
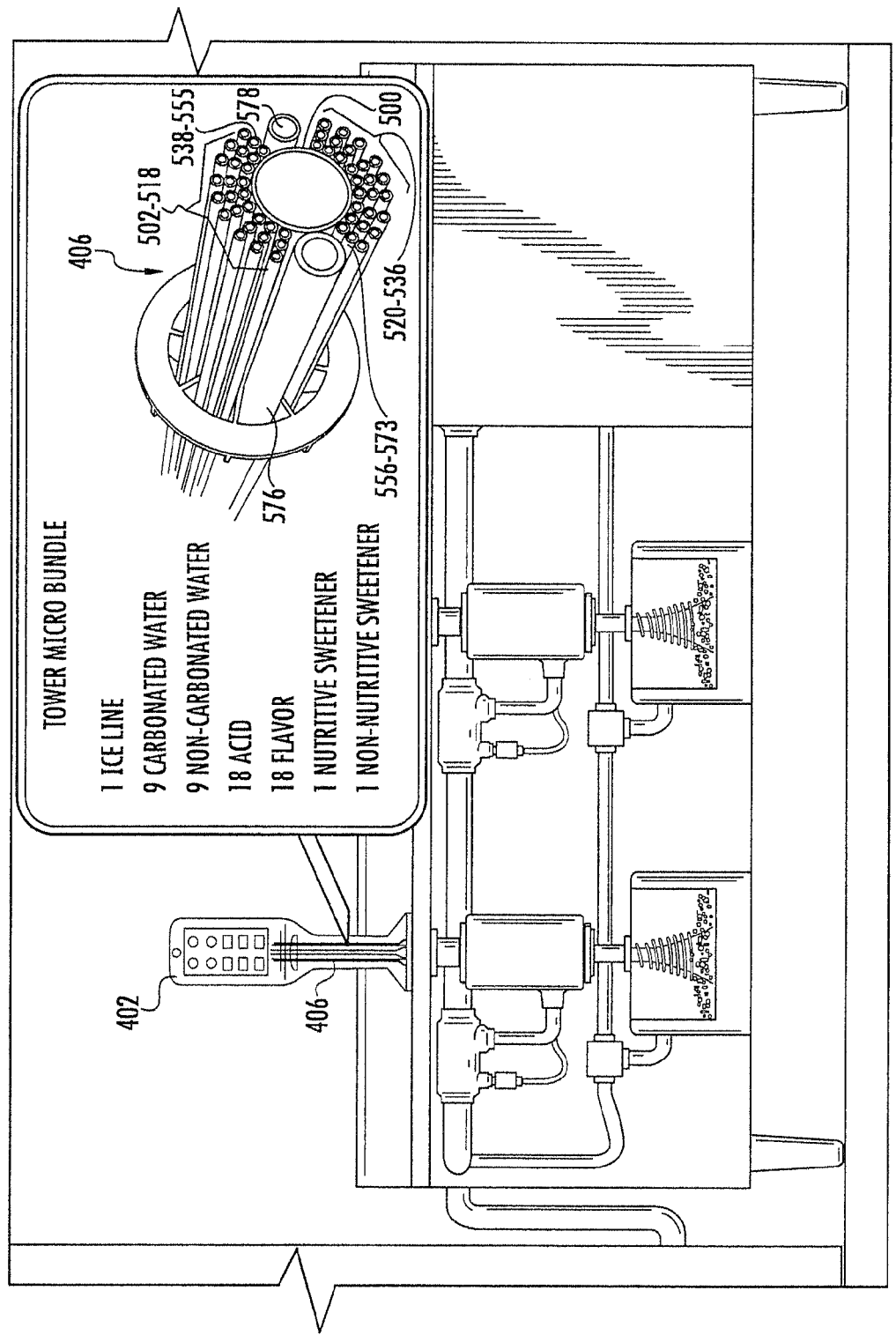
FIG. 5 illustrates an embodiment of a tower micro bundle according to various aspects of the disclosure.

As shown in FIG. 5, dispenser tower 402 may comprise a tower micro bundle 406. In the embodiment depicted, tower micro bundle 406 comprises an ice line 500, nine carbonated water lines 502, 504, 506, 508, 510, 512, 514, 516, 518, nine non-carbonated water lines 520, 522, 524, 526, 528, 530, 532, 534, 536 (including one that may be re-circulated or created on demand, e.g., from the cold water circuit, eighteen flavor lines 538, 539, 540, 541, 542, 543, 544, 545, 546, 547, 548, 549, 550, 551, 552, 553, 554, 555, eighteen acid lines 556, 558, 559, 560, 561, 562, 563, 564, 565, 566, 567, 568, 569, 570, 571, 572, 573, 574, a nutritive sweetener line 576, and a non-nutritive sweetener line 578. Tower micro bundle 406 may comprise any suitable cladding, including slots and piping.

A beverage ingredient, such as a sweetener, may be sent through a micro bundle to get better mixing. Instead of using a traditional 3/8" ID or 1/4" ID pipe wherein a sweetener may be dropped to the bottom of a cup and a consumer may not taste the sweetener when drinking a top portion of the beverage in a cup, the present disclosure allows for the use of smaller microtubes to get better mixing and have multiple dispense points (jet it in at a similar rate compared ingredients), and allow for greater dispersion throughout the beverage.

The modular dispensing system may comprise not only a central acid and flavor system, but also a local dairy and/or juice system. Thus, a beverage may be prepared with a shot of juice, e.g., a cola with a shot of lemon juice and/or lime juice. A beverage, such as a cool frappuccino or hot coffee, may be prepared with a shot of a dairy product, e.g., milk or cream.

The modular dispensing system allows for the adding of additional dispenser heads to existing towers for dispensing additional beverages while still using the centralized ingredient system or transfer unit. Such existing towers may be present at drive up systems or in-store systems.

The modular dispensing system may comprise a fast fill system for drive-up applications.

The modular dispensing system may comprise replacement bags for use in ingredient cartridges.

The modular dispensing system may comprise auto sanitizing systems, e.g., auto sanitizing of buttons at dispenser towers 66. The sanitizing system may include a sanitizer cartridge, e.g., a sanitizer cartridge replacing an ingredient cartridge. Those skilled in the art will recognize that locking of a portion of the system may be used so that a sanitizing cycle may be run. For example, a lock out feature with cartridge recognition of the sanitizer may be provided to prevent unintentional beverage dispensing. The lock out feature with cartridge recognition of the sanitizer may have mechanical and electrical redundancy.

The modular dispensing system may comprise interlocks on sweetener types.

The modular dispensing system may comprise and/or communicate with a social media system or application. For example, when a mobile device of a consumer is within a predetermined distance from a sensor linked to the modular dispensing system, a message may be sent to the consumer's mobile device that queries the consumer whether the consumer would like to purchase a beverage. Alternatively, or at the same time, a message may appear at a counter location that queries the consumer whether the consumer would like to purchase a beverage. The social media system or application may download to the modular dispensing system the preference or preferences of a consumer based on the consumer's past purchases and/or identified preferences. Thus, the modular dispensing system and/or the social media system or application may query a particular consumer when a mobile device of a consumer is within a predetermined distance from a sensor of the modular dispensing system.

The modular dispenser system may also receive a beverage order from a consumer via a social media system or application, including but not limited to the social media system or application of a seller of beverages, including but not limited to restaurants, theaters, other entertainment venues, and manufacturers and/or distributors of beverages. A consumer may order a beverage prior to arriving at counter so that the drink may be prepared and placed in a cup by the time or close to the time the consumer arrives at the counter. Alternatively, a cup bearing and RFID identifier may be prepared and made available to the consumer for filling by the time or close to the time the consumer arrives at the counter. For example, see U.S. Ser. No. 12/704,217, filed Feb. 11, 2010, published on Aug. 12, 2010 as U.S. Patent Application Publication No. 2010/0200110, which is incorporated herein by reference in its entirety. This system saves time for both consumers and beverage sellers by cutting down on wait time, ordering time, and beverage preparation time.

Thus, the system may recognize an individual and make certain decisions regarding what beverage(s) or type of beverage(s) to offer the individual. The system may change what the system traditionally offers, e.g., a shot of orange juice in a cola beverage, if such a beverage has been ordered by the individual in the past, or the individual has identified the beverage as a preference on social media system or application.

In addition, the system may handle gifts or promotions given from one entity to another. By way of example, but not limitation, the system may recognize an individual, determine whether that individual has received a gift or is eligible for a promotion, and send a query to the individual as to whether the individual will accept the gift or promotion, such as a free beverage or a beverage at a reduced price.

The system may provide a gesture interface so that a user may order a beverage at sensor without touching the sensor.

The system may also provide a sanitizing screen display, including but not limited to, a puff of steam, a wiping motion display, and ultraviolet LED.

The system may provide a user with variable pricing based on brands being sold, e.g., the system may determine what products a user may receive based on cup size.

The system may allow for a user to pull into a drive up location and through the user's mobile device (e.g., a personal digital assistant, cell phone, or smart phone), via telephone or Wi-Fi, Bluetooth or other suitable communication system, know where the user is located and shows the user a menu, and may also provide the user with a special drive up line to pick up an order.

The system may allow for geolocation for advertising due to restricted street sign usage.

The system may provide designs for various fluid flow paths for micro dosing, e.g., controlling drip, and monitoring an effluent side of the pump.

Fast fill may include systems that allow for fast fill from the bottom of a cup.

On-demand carbonation may be provided using the dosing unit.

Figure 6:
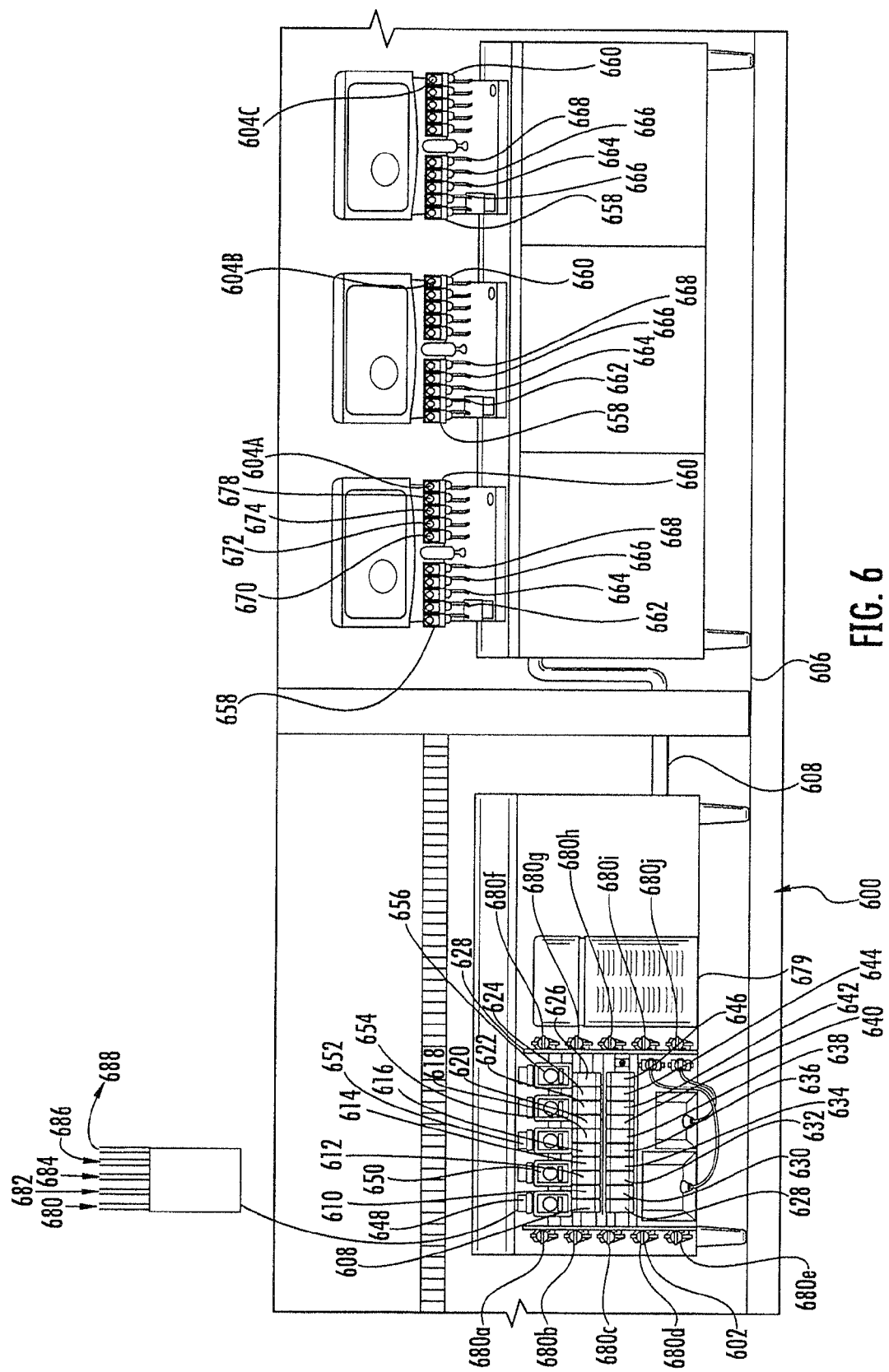
FIG. 6 illustrates an alternative embodiment of a modular dispensing system according to various aspects of the disclosure.
Figure 7:
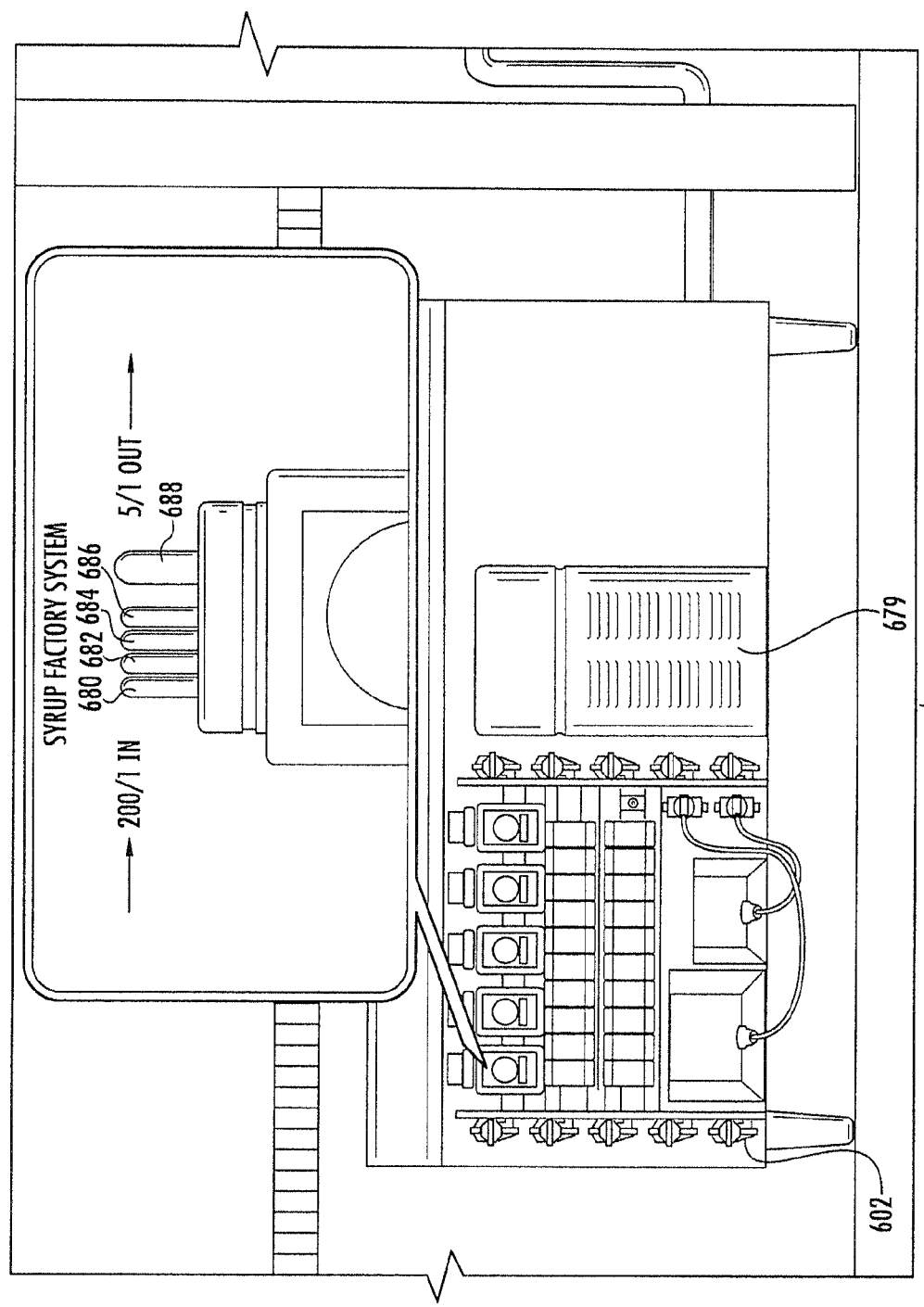
FIG. 7 illustrates an embodiment of centralized ingredient system according to various aspects of the disclosure.

FIGS. 6 and 7 illustrate other aspects of the present disclosure. A transfer unit 600 may be similar to transfer unit 16 previously described. Transfer unit 600 may comprise a water treatment system 134. Transfer unit 600 may optionally comprise an ice system (not shown), like the ice machine 136 previously described.

Transfer unit 600 may comprise a central ingredient system or central reconstitution factory 602, which may be similar to central ingredient system 20 previously described.

Central reconstitution factory system 602 may be linked to one or more conventional or legacy dispensers 604A, 604B, and 604C using a bundle 606. The linking or connection between central reconstitution factory system 602 and legacy dispensers may be achieved in a backroom at the bundle pump inlet connection. As shown in FIG. 6, central reconstitution factory system 602 may comprise a plurality of beverage ingredients. In FIG. 6, central reconstitution factory 602 comprises twenty beverage ingredients 608, 610, 612, 614, 616, 618, 620, 622, 624, 626, 628, 630, 632, 634, 636, 638, 640, 642, 644, 646. These beverage ingredients may be selected from the group consisting of a beverage flavor ingredient and an acid. Transfer unit 600 may comprise one or more mixing chambers. In FIG. 6, transfer unit 600 comprises mixing chambers 648, 650, 652, 654 and 656, and additional mixing chambers if desired. Mixing chamber 648 may correspond to nozzle dispensers 658 and 660 at legacy dispensers 604A, 604B, and/or 604C, mixing chamber 650 may correspond to nozzle dispenser 662 at legacy dispensers 604A, 604B, and/or 604C, mixing chamber 652 may correspond to nozzle dispenser 664 at legacy dispensers 604A, 604B, and/or 604C, mixing chamber 654 may correspond to nozzle dispenser 666 at legacy dispensers 604A, 604B, and/or 604C, and mixing chamber 656 may correspond to nozzle dispenser 658 at legacy dispensers 604A, 604B, and/or 604C. Additional mixing chambers (not shown) may be provided at transfer unit 600 to correspond to nozzle dispensers 670, 672, 674, and 678 at legacy dispensers 604A, 604B, and/or 604C.

Beverage ingredients may be supplied to mixing chambers from cartridges 112 previously described, or bag-in-box type containers, which prior to the present disclosure were typically placed at a beverage dispensing counter.

Syrups and other beverage ingredients may include any of those provided by PepsiCo Inc. to form beverages known under any PepsiCo branded name, such as Pepsi-Cola®. Syrup and other beverage ingredients may be pumped from cartridges 112 or other supply containers by pumps (not shown) to mixing chambers as desired. These pumps may be driven by $CO_2$ from a tank 671 or 673 and supplied through a $CO_2$ gas branch line 675. These pumps may comprise conventional syrup pumps, e.g., BIP pumps.

Each mixing chamber may correspond to a particular beverage to be provided to a nozzle of legacy dispensers 604A, 604B, and/or 604C. In the embodiment shown in FIG. 6, a beverage, e.g., a beverage of regular Pepsi-Cola®, may be formed in mixing chamber 648. Inlets to mixing chamber 648 may comprise a water supply line 680, a sweetener supply line 682, an acid supply line 684, and a flavor supply line 686. Mixing chamber 648 may comprise a beverage out line 688. The sweetener, acid, and flavor ingredients supplied to mixing chamber 648 may be highly concentrated amounts of those ingredients mixed with water prior to being supplied to mixing chamber 648, e.g., a ratio of beverage ingredient to water of about 200 to 1 by weight. After being mixed with water from water supply line 680, the mixture exiting mixing chamber 648 in beverage out line 688 may have a ratio of beverage ingredient to water of about 5 to 1 by weight. Water may be supplied to a mixing chamber from water treatment system 679.

Sweetener line 682 may supply to a mixing chamber a nutritive sweetener and/or a non-nutritive sweetener. Sweetener line 682 may be either a nutritive sweetener pump line 302 or a non-nutritive sweetener pump out line 304 as previously described.

Aspects of the disclosure are shown in FIGS. 9, 10, and 11. FIG. 9 shows a multi-tower modular dispensing system that may comprise at least a first dispensing head and a second dispensing head at a counter, a transfer unit located remotely from the counter, and piping extending from the transfer unit to the counter. The transfer unit may comprise a centralized ingredient system having a plurality of beverage ingredient sources. The centralized ingredient system may be configured to supply beverage ingredients to the piping for the dispensing of a first beverage at the counter. The piping may comprise a main micro bundle. The main micro bundle may comprise at least two separate beverage ingredient lines.

At least one doser unit may be provided corresponding to at least the first dispensing head. The doser unit may be configured to receive a beverage ingredient from the transfer unit and dose a predetermined amount of the beverage ingredient to the first dispensing head.

The doser unit may be located at the counter. The doser unit may be located below the counter.

The doser unit may supply an appropriate amount of each beverage ingredient through a tower micro bundle, the tower micro bundle comprising a plurality of separate lines, with each line corresponding to a particular beverage ingredient.

The transfer unit may comprise a water treatment system, the water treatment system configured to treat water entering the water treatment system so that it has at least one predetermined characteristic upon exiting the water treatment system.

At least one predetermined characteristic of the water upon exiting the water treatment system may be a temperature that is lower than the temperature of the water entering the water treatment system.

At least one predetermined characteristic of the water upon exiting the water treatment system is a temperature that is higher than the temperature of the water entering the water treatment system.

The main micro bundle may comprise a line from the water treatment system to the doser unit.

The transfer unit may comprise an ice machine. The main micro bundle may comprise a line from the ice machine to the doser unit.

At least the first dispensing head may be configured to receive ice from an ice hopper and dispense the ice in a predetermined amount along with the other beverage ingredients. The ice hopper may be located at the counter. The ice hopper may be located below the counter.

At least the first dispensing head may be configured to receive at least one carbonated water line and dispense carbonated water in a predetermined amount along with the other beverage ingredients.

The first dispensing head and the second dispensing head may be each configured to receive at least at least two beverage ingredients, the at least two beverage ingredients selected from the group consisting of a flavor ingredient and an acid.

The multi-tower modular dispensing system may comprise at least a first doser unit corresponding to the first dispensing head, and a second doser unit corresponding to the second dispensing head. The first doser unit may be configured to receive a first beverage ingredient from the transfer unit and dose a predetermined amount of the first beverage ingredient to the first dispensing head. The second doser unit may be configured to receive a second beverage ingredient from the transfer unit and dose a predetermined amount of the second beverage ingredient to the second dispensing head. The first beverage ingredient and the second beverage ingredient may be the same or different.

The first doser unit may be configured to supply an appropriate amount of each beverage ingredient for a first predetermined beverage to the first dispensing head through a first tower micro bundle, the first tower micro bundle comprising a plurality of separate lines, with at least one line corresponding to a particular beverage ingredient of the first predetermined beverage. The second doser unit may be configured to supply an appropriate amount of each beverage ingredient for a second predetermined beverage to the second dispensing head through a second tower micro bundle, the second tower micro bundle comprising a plurality of separate lines, with at least one line corresponding to a particular beverage ingredient of the second predetermined beverage. The first predetermined beverage and the second predetermined beverage are the same or different.

In one aspect, and as further shown in FIG. 10, a multi-tower modular dispensing system may be provided comprising at least a first dispensing head at a first counter, and at least a second dispensing head at a second counter. The first and second counters may be remote from each other. A transfer unit may be located remotely from the first counter and the second counter. Piping may extend from the transfer unit to the first counter and the second counter. The transfer unit may comprise a centralized ingredient system having a plurality of beverage ingredient sources. The centralized ingredient system may be configured to supply beverage ingredients to the piping for the dispensing of a first beverage at the first counter and for the dispensing of a second beverage at the second counter. The piping may comprise a main micro bundle. The main micro bundle may comprise at least two separate beverage ingredient lines. The first beverage and the second beverage may be the same or different.

The piping may be configured to supply beverage ingredients from the transfer unit to the first counter and the second counter in series or in parallel. At least the first counter may comprise at least an additional dispensing head.

As shown in FIG. 11, a multi-tower modular dispensing system may comprise a plurality of dispensing heads at a first counter, a plurality of dispensing heads at a second counter, the first and second counters remote from each other, a transfer unit located remotely from the first counter and the second counter, and piping extending from the transfer unit to the first counter and the second counter. The transfer unit may comprise a centralized ingredient system having a plurality of beverage ingredient sources, the centralized ingredient system configured to supply beverage ingredients to the piping for the dispensing of a plurality of beverages at the first counter and for the dispensing of a plurality of beverages at the second counter, the piping comprising at least one main micro bundle, the main micro bundle comprising a plurality of separate beverage ingredient lines. The piping may be configured to supply beverage ingredients from the transfer unit to the first counter and the second counter in series or in parallel.

The invention herein has been described and illustrated with reference to the embodiments of the figures, but it should be understood that the features of the invention are susceptible to modification, alteration, changes or substitution without departing significantly from the spirit of the invention. For example, the dimensions, number, size and shape of the various components may be altered to fit specific applications. Accordingly, the specific embodiments illustrated and described herein are for illustrative purposes only and the invention is not limited except by the following claims and their equivalents.

What is claimed is:

1. A dispensing method comprising:
   providing at least a first dispensing head of a first tower at a first counter;
   providing at least a second dispensing head of a second tower at a second counter, the first and second counters remote from each other;
   providing a transfer unit located remotely from the first counter and the second counter, the transfer unit comprising a centralized ingredient system having a plurality of beverage ingredient sources;
   providing piping extending from the transfer unit to the first counter and the second counter;
   supplying from the centralized ingredient system a beverage ingredient to the piping; and
   dispensing of a first beverage at the first counter according to a consumer preference communicated from a social media system.

2. The method of claim 1, wherein the piping is configured to supply beverage ingredients from the transfer unit to the first counter and the second counter in parallel.

3. The method of claim 1, further comprising:
   sending a query to a consumer within a predetermined distance from the modular dispensing system to query the consumer whether the consumer would like to purchase a beverage.

4. The method of claim 3, wherein the query is based upon the preference of a consumer based on one of past purchases and identified preferences.

5. The method of claim 4, wherein the query is based on a geographic location of the user.

6. The method of claim 1, further comprising:
   receiving a beverage order from a consumer via the social media system or application.

7. The method of claim 1, further comprising:
   dosing a predetermined amount of the first beverage ingredient from a first doser unit corresponding to the first dispensing head through the piping from the transfer unit to the first dispensing head; and
   dosing a predetermined amount of a second beverage ingredient from a second doser unit corresponding to the second dispensing head through the piping from the transfer unit to the first dispensing head.

8. The method of claim 7, wherein the piping comprises a micro bundle pipe.

9. The method of claim 7, wherein the first doser unit and the second doser unit are located below the counter.

10. The method of claim 7, wherein the first doser unit supplies an appropriate amount of each beverage ingredient through a first tower micro bundle, the first tower micro bundle comprising a plurality of separate lines, with each line corresponding to a particular beverage ingredient.

11. The method of claim 1, wherein the first dispensing head and the second dispensing head are each configured to receive at least two beverage ingredients selected from a flavor ingredient and an acid.

12. The method of claim 7, wherein the first beverage ingredient and the second beverage ingredient are the same.

13. A multi-tower modular dispensing system comprising:
   at least a first dispensing head of a first tower at a first counter;
   at least a second dispensing head of a second tower at a second counter, the first and second counters remote from each other;

a transfer unit located remotely from the first counter and the second counter, the transfer unit comprising a centralized ingredient system having a plurality of beverage ingredient sources;

piping extending from the transfer unit to the first counter and the second counter;

wherein the centralized ingredient system is configured to supply beverage ingredients to the piping for the dispensing of a first beverage at the first counter and for the dispensing of a second beverage at the second counter, wherein the system is configured to communicate with a social media system.

14. The system of claim 13, further comprising:

wherein the system is configured to query to a consumer within a predetermined distance from the modular dispensing system to query the consumer whether the consumer would like to purchase a beverage.

15. The system of claim 14, wherein the query is based upon the preference of a consumer based on one of past purchases and identified preferences.

16. The system of claim 14, wherein the query is based on a geographic location of the user.

17. The system of claim 13, further comprising:

receiving a beverage order from a consumer via the social media system or application.

18. The system of claim 14, wherein the system recognizes a consumer, determines whether that consumer is eligible for a gift or a promotion, and the query is based on the gift or promotion determination.

19. The system of claim 14, wherein the query is based upon a past beverage order by the consumer.

20. The system of claim 13, wherein the dispensing head of the first or second tower is a legacy dispenser.

* * * * *